US008842495B2

(12) United States Patent
Hersey

(10) Patent No.: US 8,842,495 B2
(45) Date of Patent: Sep. 23, 2014

(54) ULTRASONIC MOTION DETECTION

(75) Inventor: Stephen Hersey, Waltham, MA (US)

(73) Assignee: Rethink Robotics, Inc., Boston, MA (US)

( * ) Notice: Subject to any disclaimer, the term of this patent is extended or adjusted under 35 U.S.C. 154(b) by 130 days.

(21) Appl. No.: 13/243,253

(22) Filed: Sep. 23, 2011

(65) Prior Publication Data

US 2013/0077442 A1    Mar. 28, 2013

(51) Int. Cl.
G01S 15/66 (2006.01)
G01S 11/14 (2006.01)
G01S 15/52 (2006.01)
G01S 7/536 (2006.01)

(52) U.S. Cl.
CPC ............. *G01S 15/526* (2013.01); *G01S 15/66* (2013.01); *G01S 11/14* (2013.01); *G01S 7/536* (2013.01)
USPC .......... 367/124; 367/118; 367/119; 367/126; 367/129

(58) Field of Classification Search
CPC ................................. G01S 15/66; G01S 11/14
USPC .............................. 367/93, 38, 99; 340/932.2
See application file for complete search history.

(56) References Cited

U.S. PATENT DOCUMENTS

| 3,967,283 | A |   | 6/1976  | Clark et al.            |
|-----------|---|---|---------|-------------------------|
| 4,107,659 | A | * | 8/1978  | Massa ............. 340/552 |
| 4,197,528 | A | * | 4/1980  | Gibson ............ 367/93 |
| 4,349,897 | A | * | 9/1982  | Boehme et al. ...... 367/98 |
| 4,628,496 | A |   | 12/1986 | Lee                     |
| 4,821,192 | A | * | 4/1989  | Taivalkoski et al. ........... 701/25 |
| 4,991,146 | A | * | 2/1991  | Ransdell et al. .............. 367/98 |
| 5,638,824 | A |   | 6/1997  | Summers                 |
| 5,689,250 | A | * | 11/1997 | Kremser ................ 340/904 |
| 5,793,704 | A | * | 8/1998  | Freger .................. 367/95 |
| 6,248,068 | B1| * | 6/2001  | Seabron ................ 600/437 |
| 6,331,964 | B1|   | 12/2001 | Barone                  |
| 6,445,988 | B1|   | 9/2002  | Breed et al.            |
| 6,885,300 | B1|   | 4/2005  | Johnston et al.         |
| 7,027,355 | B2| * | 4/2006  | Baldwin et al. ........... 367/93 |
| 7,504,989 | B2| * | 3/2009  | Tsuchihashi et al. ...... 342/91 |
| 7,679,996 | B2|   | 3/2010  | Gross                   |
| 7,821,870 | B2|   | 10/2010 | Ramakrishnan            |

(Continued)

FOREIGN PATENT DOCUMENTS

CN    1215153 A    4/1999
DE    3149256 A1   6/1983

(Continued)

OTHER PUBLICATIONS

International Search Report and Written Opinion mailed Dec. 14, 2012 for International Application No. PCT/US2012/056585 (11 pages).

*Primary Examiner* — Luke Ratcliffe
*Assistant Examiner* — Hovhannes Baghdasaryan
(74) *Attorney, Agent, or Firm* — Bingham McCutchen LLP

(57) ABSTRACT

Movements of objects within a space are adaptively detected by emitting ultrasound waves into the space and detecting reflections of the ultrasound waves, determining locations of objects within the space based on the ultrasound reflections, and determining real-time movements of the objects based on, in certain embodiments, (i) amplitude differences between amplitudes of echoes in a current wave cycle and an average amplitude over a plurality of wave cycles and (ii) elapsed times of the ultrasound reflections associated with the amplitude differences.

23 Claims, 9 Drawing Sheets

(56) References Cited

U.S. PATENT DOCUMENTS

| | | |
|---|---|---|
| 2004/0243015 A1* | 12/2004 | Smith et al. .................... 600/511 |
| 2008/0205194 A1* | 8/2008 | Chiappetta et al. ............. 367/93 |
| 2009/0001226 A1 | 1/2009 | Haygood |
| 2009/0145232 A1 | 6/2009 | Suginouchi et al. |
| 2010/0023195 A1* | 1/2010 | Traster ............................ 701/23 |
| 2010/0134321 A1* | 6/2010 | Kim ........................... 340/932.2 |
| 2010/0270091 A1 | 10/2010 | Ding |
| 2010/0321184 A1 | 12/2010 | Dreuillet et al. |

FOREIGN PATENT DOCUMENTS

| | | |
|---|---|---|
| EP | 0026385 A1 | 4/1981 |
| JP | 63193085 A | 8/1988 |
| JP | 63311192 A | 12/1988 |
| JP | 1012284 A | 1/1989 |
| JP | 3277987 A | 12/1991 |
| JP | 5215850 A | 8/1993 |
| JP | 2000028358 A | 1/2000 |
| WO | WO-93/19385 A1 | 9/1993 |

* cited by examiner

ULTRASONIC MOTION DETECTION

TECHNICAL FIELD

In various embodiments, the present invention relates generally to ultrasonic motion detectors implemented in automated industrial systems.

BACKGROUND

Automated industrial systems, e.g., autonomous robots, have been developed to be more self-sufficient since the emergence of the first manufactured robots over half a century ago. Unlike the earliest robots, contemporary devices require less human assistance; they are capable of independently functioning and completing tasks in various types of unstructured environments. However, bringing robots and humans into spatial proximity leads to the fundamental concern of how to ensure safety for the human. A heavy industrial robot with powerful actuators and unpredictably complex behavior can cause harm, for instance, by stepping on a human's foot or falling on him. Therefore, detecting the presence of moving objects in the vicinity of robots is crucial for ensuring the safety of people working near the robotic system.

One approach is to equip the robot with motion-detection capabilities. Various motion-detecting technologies exist, including passive infrared detectors (PIRs), Doppler microwave sensors, ultrasonic rangefinders, scanned laser rangefinders, vision-based systems, pressure-sensitive mats, and arrays of infrared emitter/detector pairs, which are known as "light curtains." PIRs are commonly used for intrusion detection systems; they provide high sensitivity to the presence of warm moving objects. However, PIRs have very wide detection angles (typically 90 to 180 degrees) and are incapable of estimating the distance between moving objects and the robots; they thus provide inadequate data on the bearing (velocity) of a detected human. Doppler microwave sensors sense moving objects over a wide field of view; however, they provide neither range (distance) nor bearing (velocity) information. Additionally, multiple Doppler systems can interfere with each other, precluding their deployment as multichannel systems or on multiple robots. Scanned laser rangefinders can provide excellent range and bearing data; they have fields of view up to 180 degrees. However, scanned laser rangefinders are expensive and present a potential vision hazard from the bright laser light source. In addition, scanned laser rangefinders sense objects along a narrow plane; this requires precise adjustments of the laser to ensure detection of, for example, humans of various heights. Further, scanned laser rangefinders do not distinguish moving objects from stationary ones; they thus require significant computational overhead on the part of the robot controller.

Vision-based systems are expensive and require significant amounts of computing power to reliably detect and locate moving objects. Pressure-sensitive mats can provide good data on the location of the objects, but they are susceptible to damage and wear. In addition, pressure-sensitive mats require unobstructed floor areas for operation; this may not be available in industrial factories. Light curtains require the presence of restricted-access "choke points" at which to locate the sensors and thus are difficult to install. Further, light curtains can sense only along a line at the light curtain location and therefore have a limited field of view.

Historically, ultrasonic rangefinders used in the robotics industry were relatively inexpensive and easy to interface. Additionally, ultrasonic rangefinders have relatively narrow fields of view, making them suitable for multi-channel coverage of the detected area. Therefore, several ultrasonic rangefinders can be operated in close proximity without mutual interference by sequencing their pulsed ultrasonic emissions over time. However, ultrasonic rangefinders do not distinguish between stationary and moving objects and they report only the range between the nearest object and the robot. These sensors are thus unable to detect an approaching object, such us a human being, when another object (for example, a chair, or the robot's own arm) is within the detection field of view or closer than the approaching human.

Consequently, there is a need for automated industrial systems that can reliably detect the range and bearing of one or more moving objects, while ignoring stationary objects in the vicinity of e.g., an autonomous robot, thereby protecting humans in the working environment.

SUMMARY

In various embodiments, the present invention relates to systems and methods for adaptively detecting the real-time approximate range and bearing of moving objects utilizing ultrasound. In various embodiments, an ultrasound transducer comprises multiple ultrasound transducer elements. It thereby permits a detection with full 360 degree field of view and is capable of detecting multiple moving objects at different distance ranges with different velocities in real time while ignoring the presence of immobile objects as a static background. In addition, ultrasound transducers in accordance herewith are easy to deploy in existing facilities without significant modification thereof. Other advantages of the invention include, in various embodiments, robustness, resistance to damage or degradation, and low cost of manufacture.

Accordingly, in one aspect, the invention pertains to a method of detecting movements of objects within a space using ultrasound transducer elements. In some embodiments, the method comprises: (i) emitting ultrasound waves into a space and detecting reflections of the ultrasound waves from objects in the space, (ii) determining locations of the objects based on the elapsed time of the ultrasound reflections, and (iii) determining real-time movements of the objects based on (i) amplitude differences between amplitudes of echoes in a current wave cycle and an average amplitude over multiple wave cycles and (ii) elapsed times of the ultrasound reflections associated with the amplitude differences. In various embodiments, the wave cycle comprises emission of multiple ultrasound waves directed at different spatial zones.

In various embodiments, the real-time movements of objects for each zone are determined based on amplitude deviations of waves reflected in this single spatial zone within a wave cycle. For example, the amplitude deviations may be calculated by subtracting the average amplitude within the zone from the amplitudes of the echoes within the zone.

In some embodiments, a start or an end of an echo occurs when a reflected wave has an amplitude above a predetermined maximum or minimum intensity threshold, respectively. The duration of the echoes can be determined based on the maximum and minimum intensity thresholds and the amplitude deviations. The real-time movements of objects can then be detected utilizing the amplitude deviations measured during the echoes.

In various embodiments, the predetermined maximum and minimum intensity thresholds can be adjusted based on the average amplitude and/or the elapsed times of the ultrasound reflections associated with the amplitude differences.

In one embodiment, the amplitudes of the echoes within a zone include the amplitudes of echoes from the current wave cycle and from at least one preceding wave cycle. In another embodiment, an average of the amplitude deviations is calculated over at least two successive times within a zone in the current cycle.

In some embodiments, the real-time movements are determined based on the peak-detected amplitude deviation within a zone in the current wave cycle. For example, an average of peak-detected amplitude deviations may be calculated over multiple reflections from adjacent spatial zones in the current wave cycle; the real-time movements of objects are then determined based on the averaged peak-detected amplitude deviation.

In various embodiments, changes in an acoustic environment of the transducer elements are detected by tracking an integral of the amplitude deviations over time in each wave cycle for each transducer element. In some embodiments, the average amplitude of at least one transducer element can be replaced with an amplitude of the current wave cycle and/or at least one preceding wave cycle when the integral of the amplitude deviations of the at least one transducer element exceeds a predetermined threshold. In another embodiment, the average amplitudes of all transducer elements are replaced with amplitudes of the current wave cycle and/or at least one preceding wave cycle when the integral of amplitude deviations of a single transducer element and/or of all transducer elements exceeds a predetermined threshold. In one embodiment, the average amplitude is calculated from amplitudes of echoes received over a sufficient time to encompass changes within the acoustic environment.

In various embodiments, the average amplitudes are updated based on the amplitudes of the echoes in the current wave cycle.

In one embodiment, the ultrasound waves are emitted sequentially across zones. In another embodiment, the ultrasound waves are emitted simultaneously across zones.

In a second aspect, the invention relates to an ultrasound transducer system. In various embodiments, the system includes: (i) an ultrasound transducer comprising multiple transducer elements, each element emitting and receiving ultrasound within a spatial zone defined by a solid angle, (ii) drive circuitry which is coupled to the transducer elements, and (iii) a controller for controlling ultrasound waves emitted from the transducer elements and determining movements of objects based on (i) amplitude differences between amplitudes of echoes in a current cycle and an average amplitude over multiple wave cycles and (ii) elapsed times of the ultrasound reflections associated with the amplitude differences. In various implementations, the transducer elements are arranged in a cluster and/or a ring.

In some embodiments, some of the emitting and receiving angles of the transducer elements overlap.

In one embodiment, a finite impulse response filter is used for calculating the average amplitude. In another embodiment, an infinite impulse response filter is utilized for calculated the average amplitude.

In still another aspect, the invention relates to a robot implementing ultrasonic motion detection as described above. In various embodiments, the robot comprises at least one actuator, an actuator controller for operating the at least one actuator, and a movement-detection system. The movement-detection system may comprise an ultrasound transducer having a plurality of transducer elements, each of which emits and receives ultrasound with a spatial zone defined by a solid angle; drive circuitry coupled to the transducer elements; and a detection-system controller for controlling ultrasound waves emitted from the transducer elements and determining movements of objects based on (i) amplitude differences between amplitudes of echoes in a current wave cycle and an average amplitude over a plurality of wave cycles and (ii) elapsed times of the ultrasound reflections associated with the amplitude differences. The actuator controller may be responsive to the movement-detection system, disabling the actuator(s) upon detection of movement proximate to the robot.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology. Furthermore, the term "substantially" means±10%, and in some embodiments, ±5%.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

Figure 1A:
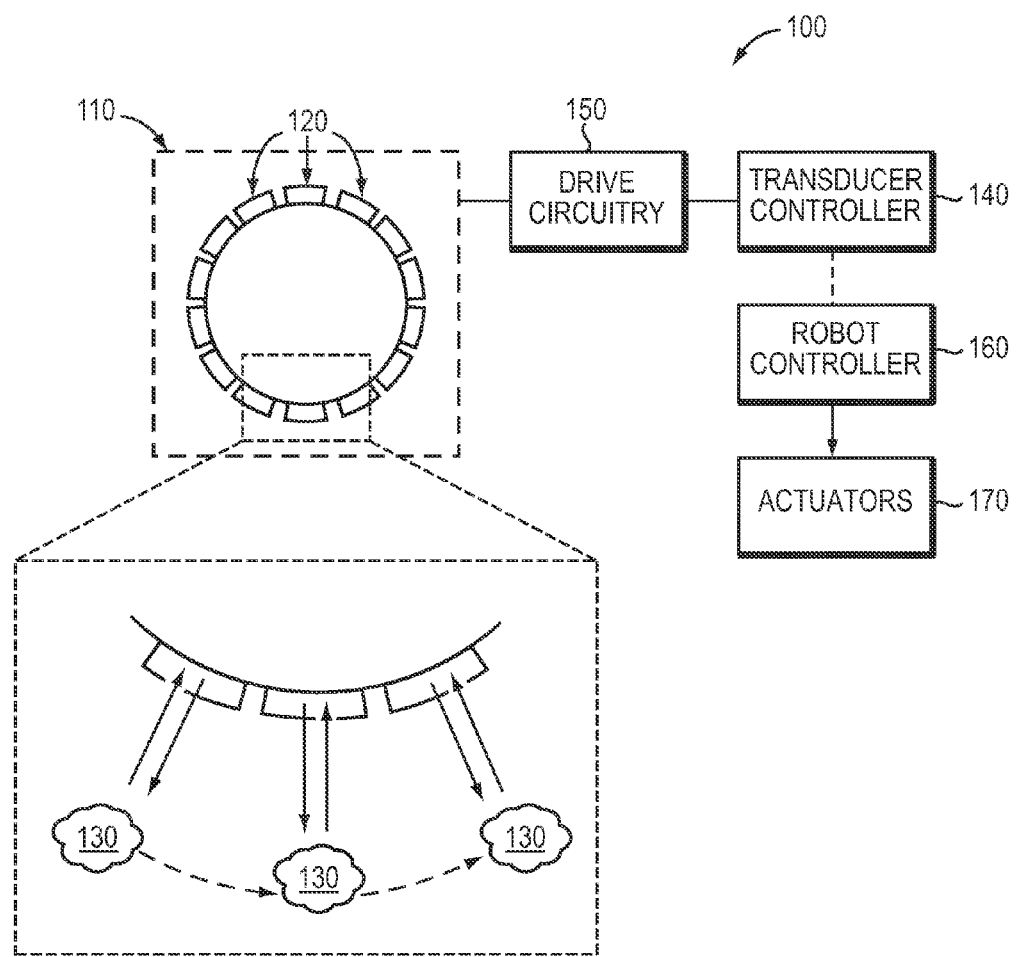
FIG. 1A schematically depicts an exemplary ultrasound transducer system.

FIG. 1A depicts an exemplary ultrasound transducer system 100 in accordance with embodiments of the present invention, although alternative systems with similar functionality are also within the scope of the invention. As depicted, an ultrasound transducer 110 includes multiple transducer elements 120. Each transducer element may emit directional ultrasound waves or pulses towards objects 130, e.g., humans or equipment, and receive the reflected waves therefrom. The elapsed time between the time of an ultrasound wave emission and the reception of a reflected wave can be used to determine the distance between the ultrasound emitter and the object causing the reflection. A transducer controller 140 regulates several aspects of the emitted ultrasound signals, e.g., frequency, phase, and amplitude, by controlling the transducer elements via the associated drive circuitry 150 (which sends signals to the transducer elements 120). In addition, the controller 140 may analyze the nearby spatial arrangements of the transducer based on the reflected signals as described in greater detail below.

Figure 1B:
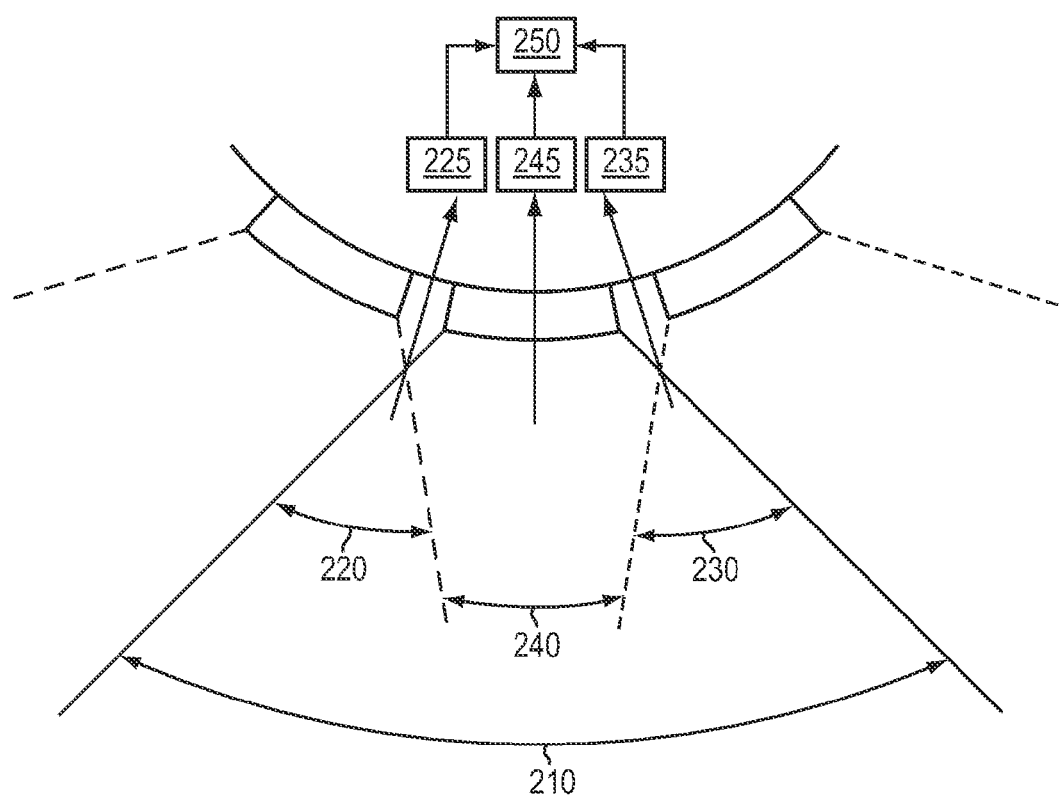
FIG. 1B depicts transducer elements emitting and receiving ultrasound within a spatial zone defined by a solid detection angle.

In one embodiment, each transducer element 120 is associated with a separate controller 140 and/or drive circuitry 150. The controllers and drive circuitry may use identical signal-processing circuits and have the same electrical and acoustic characteristics. In another embodiment, some or all of the transducer elements 120 are regulated by a single controller and drive circuitry. In various embodiments, the transducer elements 120 are arranged in a cluster and/or a ring with the fields of view extending outward from a single location in a common horizontal plane. Each element 120 emits and receives ultrasound within a spatial zone defined by a solid detection angle, as depicted in FIG. 1B. The transducer thus has a detection angle with a full 360 degree field of view. Within the solid detection angle of each transducer element (e.g., the angle 210), a portion of the angle may overlap with the detection angles of other elements (e.g., the angles 220, 230). Information from the ultrasound waves transmitted in the non-overlapped region 240 and the overlapped areas 220 and 230 is delivered and stored in the memory 250. This implementation ensures the detection of movements of every object in the space, even at the boundaries of two adjacent transducer elements.

In various embodiments the controller 140 may be provided as either software, hardware, or some combination thereof. For example, the system may be implemented on one or more server-class computers, such as a PC having a CPU board containing one or more processors such as the Core Pentium or Celeron family of processors manufactured by Intel Corporation of Santa Clara, Calif. and POWER PC family of processors manufactured by Motorola Corporation of Schaumburg, Ill., and/or the ATHLON line of processors manufactured by Advanced Micro Devices, Inc., of Sunnyvale, Calif. The controller may contain a processor that includes a main memory unit for storing programs and/or data relating to the methods described above. The memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), or programmable logic devices (PLD). In some embodiments, the programs may be provided using external RAM and/or ROM such as optical disks, magnetic disks, as well as other commonly used storage devices.

For embodiments in which the controller is provided as a software program, the program may be written in any one of a number of high level languages such as FORTRAN, PASCAL, JAVA, C, C++, C#, LISP, PERL, BASIC, PYTHON or any suitable programming language. Additionally, the software can be implemented in an assembly language and/or machine language directed to the microprocessor resident on a target device.

The illustrated system may advantageously be deployed on an industrial robot. In general, an industrial robot is an automatically controlled, reprogrammable, multipurpose manipulator programmable in three or more axes. Most robots include robotic arms and/or manipulators that operate within a working envelope, and whose movements are driven by actuators operated by a robot controller; see, e.g., U.S. Pat. No. 5,650,704 and U.S. Ser. No. 12/843,540, filed on Jul. 26, 2010, and Ser. No. 13/159,047, filed on Jun. 13, 2011, the entire disclosures of which are hereby incorporated by reference. Thus, as illustrated, a robot controller 160 may control the kinematics of a robot, including movements of manipulators and appendages, by signals sent to actuators 170 in a manner well-known to those skilled in the art. Here, the controller 160 is responsive to signals from transducer controller 140. For example, when the transducer controller 140 detects a moving object in proximity to the robot's working envelope, it signals robot controller 160 which, in turn, disables all or the relevant actuators 170 whose operation might cause danger to the detected moving object. Of course, the controllers 140, 160 need not be separate entities, but may instead be implemented within a single overall system controller.

Figure 2:
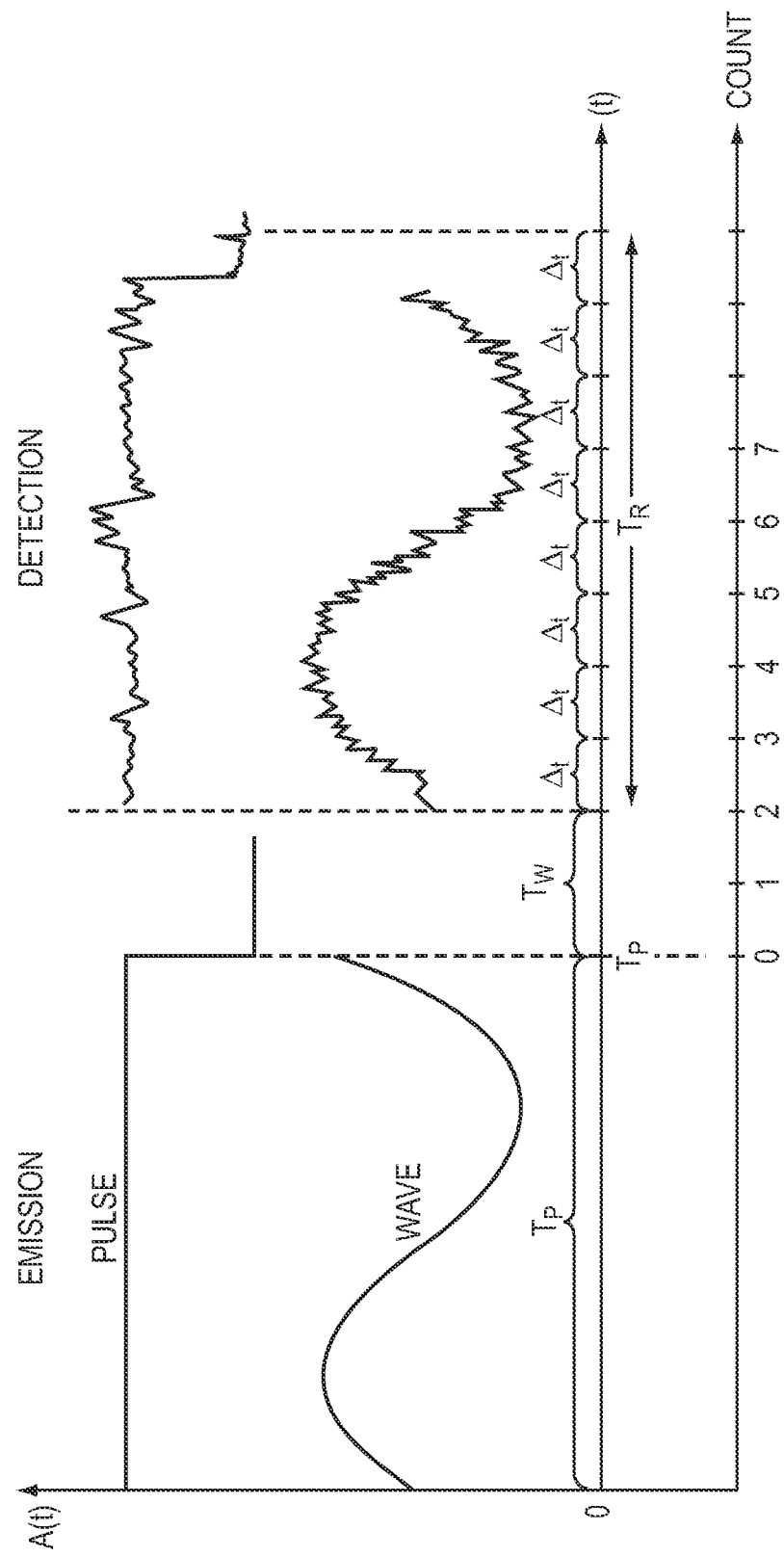
FIG. 2 depicts ultrasound waves or pulses emitted into a space and detected as reflections from objects in the space.
Figure 3:
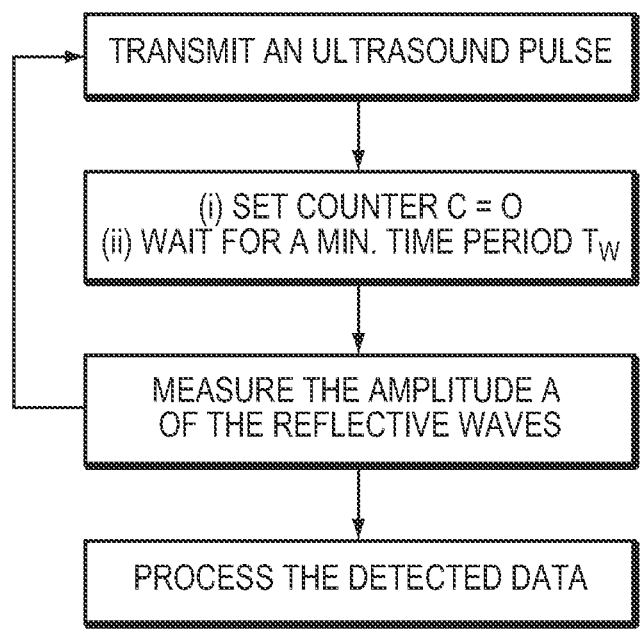
FIG. 3 illustrates an iterative process for detecting moving objects.

Referring to FIG. 2, in various embodiments, each transducer element emits an ultrasound wave (or pulse) having a duration of Tp within a spatial zone. The ultrasound waves (or pulses) may be emitted sequentially or simultaneously across zones. At the end of the wave (or pulse) signal, the transducer controller sets a counter C to zero counts. Throughout the detection procedure, the counter C increases at a fixed time interval $\Delta t$, the magnitude of which is determined based on a convenient unit of spatial resolution. For example, for a spatial resolution of 1 centimeter, $\Delta t$ may be set to 58 µs, which is determined by the speed of sound in the air. The value of the counter C thus represents the distance of the object based on the time that transducer elements receive the reflected ultrasound waves. After transmission of the ultrasound wave (or pulse), a minimum time period $T_W$ is allowed to elapse before measuring the amplitude of reflected waves. This allows for settling of the ultrasonic transducer detection system and ignores objects that are closer than the minimum detection range. Once $T_W$ has elapsed, the transducer controller measures the amplitudes A of the reflected waves received by the transducer elements at each time interval $\Delta t$ for a duration of $T_R$ after the end of $T_W$. The measured amplitudes of reflective waves are then stored in memory—in particular, in an array indexed by the counter C, such that each array element, i.e., the data point, represents a measured amplitude A (t) at a specific time t related to a specific distance range in the current wave cycle. Each array element is then processed by the controller to determine locations and movements of the objects using a motion-detection algorithm, as described below. Once $T_R$ has elapsed, the transducer elements emit an ultrasound signal and the detection cycle is repeated. FIG. 3 depicts the iterative process of adaptively detecting movements of moving objects in real time. In one embodiment, this detection cycle is operated with a time interval of, e.g., 200 milliseconds or less between each signal to optimize the time resolution of detecting moving objects.

Figure 4:
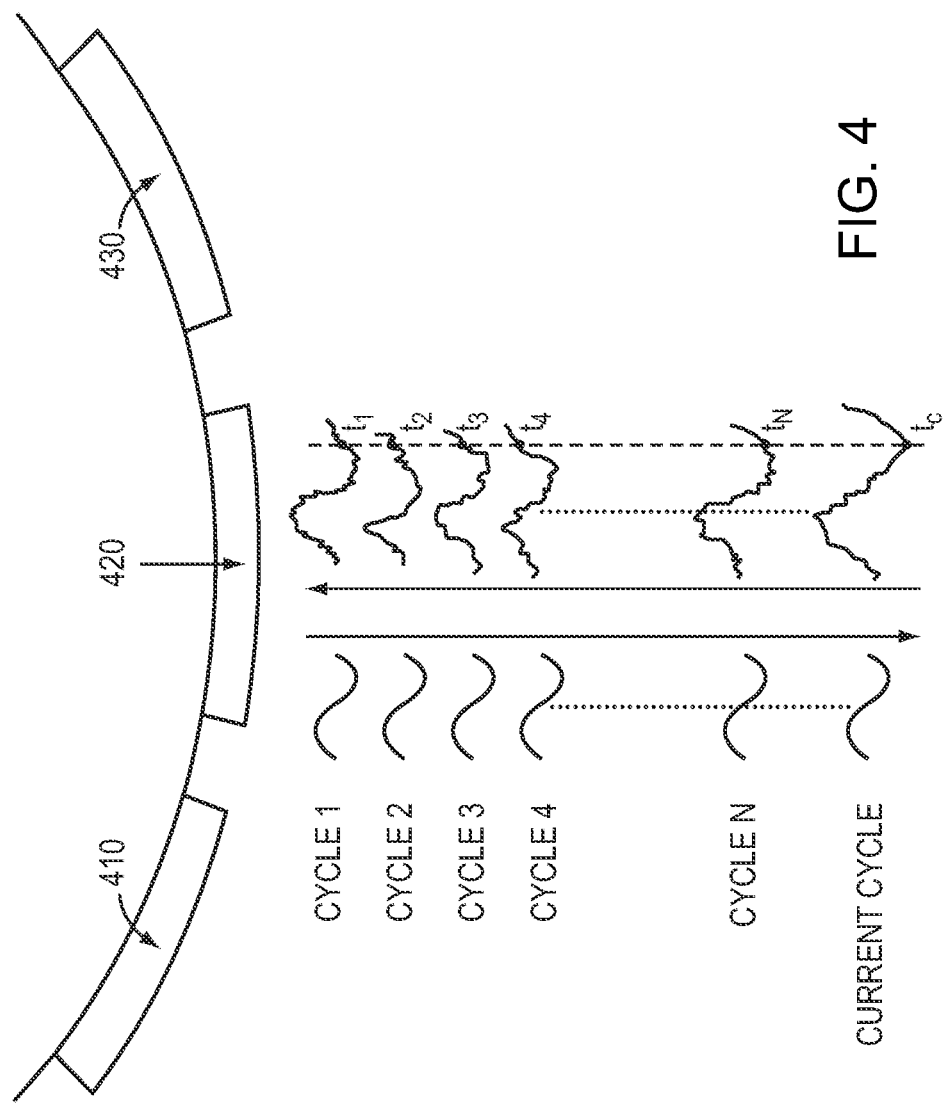
FIG. 4 depicts the method of calculating the amplitude deviations.

Each transducer element is independent and has its own data set. The motion-detection algorithm is designed to process the data set and determine the movements of the objects while ignoring stationary objects. The algorithm may be optimized for minimum computational overhead, so that it can be executed in real time using a low-cost microcontroller. Additionally, the motion-detection algorithm may identify and report multiple moving objects at different distances (ranges)

with different velocities (bearings). With reference to FIG. 4, the principle of the algorithm is that, for each point in time, an amplitude deviation of the current reflected wave cycle, e.g., $D(t_c)$, is calculated by subtracting the currently acquired amplitude $A(t_c)$ with a long-term average amplitude reading, $\overline{A}(t)$, from prior detection cycles—e.g., from cycle 1 to cycle N, $D(t_c)=A(t_c)-\overline{A}(t)$. The amplitudes of the reflected ultrasound waves from stationary objects may be treated as a static background; the amplitude deviations contributed from the stationary objects are thus negligible. By contrast, the amplitude deviations of moving objects are dynamic and may be further processed with the associated elapsed times received by the transducer elements to determine the range and bearing of the moving objects.

In some embodiments, the amplitude deviation is determined within the duration of an echo, where the start of the echo occurs when a reflected wave has an amplitude above a predetermined maximum intensity threshold and the end of the echo occurs when the amplitude is below a predetermined minimum intensity threshold. A long-term average amplitude $\overline{A}(t)$ of the echoes at a time t, within the echo duration, is then subtracted from the measured echo amplitude A(t) at the time t in the current reflective cycle to derive an amplitude deviation D(t) for the time t. The durations and states of the echoes may be changed in some conditions. For example, if the amplitude deviation is smaller than a specific minimum threshold $D_{min}$ and the minimum echo duration has been exceeded, the echo state may be changed from "true," i.e. the echo exists, to "false," i.e., the echo no longer exists; in this case, the controller is ready to detect another echo. If an amplitude deviation is larger than a specific maximum threshold $D_{max}$, the echo state may be changed from "false" to "true"; in this case the range data is added to the array of detected echoes, and the echo count increases by one. In one embodiment, $D_{min}$ and $D_{max}$ are both predetermined values and can be adjusted based on, e.g., the long-term average amplitudes or the ranges of the detected objects, as further described below.

The long-term average amplitudes can be calculated utilizing any of several approaches, e.g., using a finite impulse response (FIR) filter or an infinite impulse response (IIR) filter. FIR filters have a fixed-duration impulse response; the long-term average amplitudes can be simply calculated from an average amplitude of N prior cycles, i.e., $$\overline{A}(t) = \frac{1}{N}(A(t_1) + A(t_2) + A(t_3) + \dots + A(t_N)). \quad (1)$$

However, this approach requires additional memory to store multiple sets of data from previous cycles; it thereby increases the cost of implementation. IIR filters have an impulse response function that is non-zero over an infinite length of time; the long-term average amplitudes are calculated using a one-out-of-N algorithm as:

$$\overline{A}(t) = \frac{1}{N}(\overline{A}(t_{N-1}) \times (N-1) + A(t_N)). \quad (2)$$

At the end of each detection wave cycle, the long-term average amplitude may be updated utilizing eq. (2) to account for the measured echo amplitude in the current cycle. This approach provides an improved performance with lower memory usage and reduces the computational load. In one embodiment, the value of N is an integer power of 2; this allows the multiplication and division of integers to be replaced with left and right shift operations that are computationally less expensive.

In practice, the amplitude deviations from a spatial zone within a wave cycle based on the above definition may be noisy due to random variations of the amplitudes in the echo waves. Several approaches can be implemented for eliminating the random variations.

Figure 5:
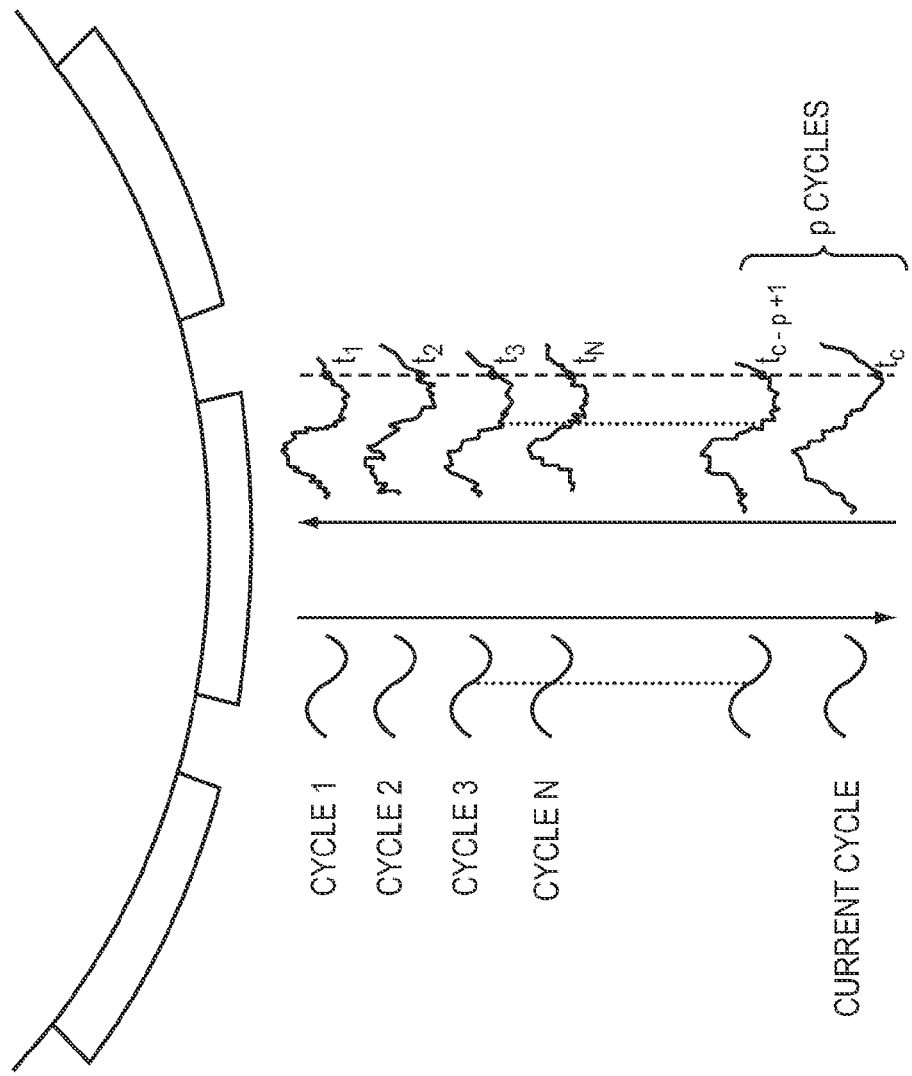
FIG. 5 depicts the method of calculating the time averaged amplitude deviations over multiple wave cycles.

In various embodiments, the time-averaged amplitude deviations can be used for eliminating random variations in the echo amplitudes; it is useful in a situation where moving objects move relatively slow compared with the emitted frequency of the wave cycles. FIG. 5 depicts an exemplary time-averaged amplitude deviation over P wave cycles:

$$\overline{D}_w(t_c) = \frac{1}{P}(D(t_{c-p+1}) + D(t_{c-p+2}) + D(t_{c-p+3}) + \dots + D(t_c)). \quad (4)$$

Figure 6:
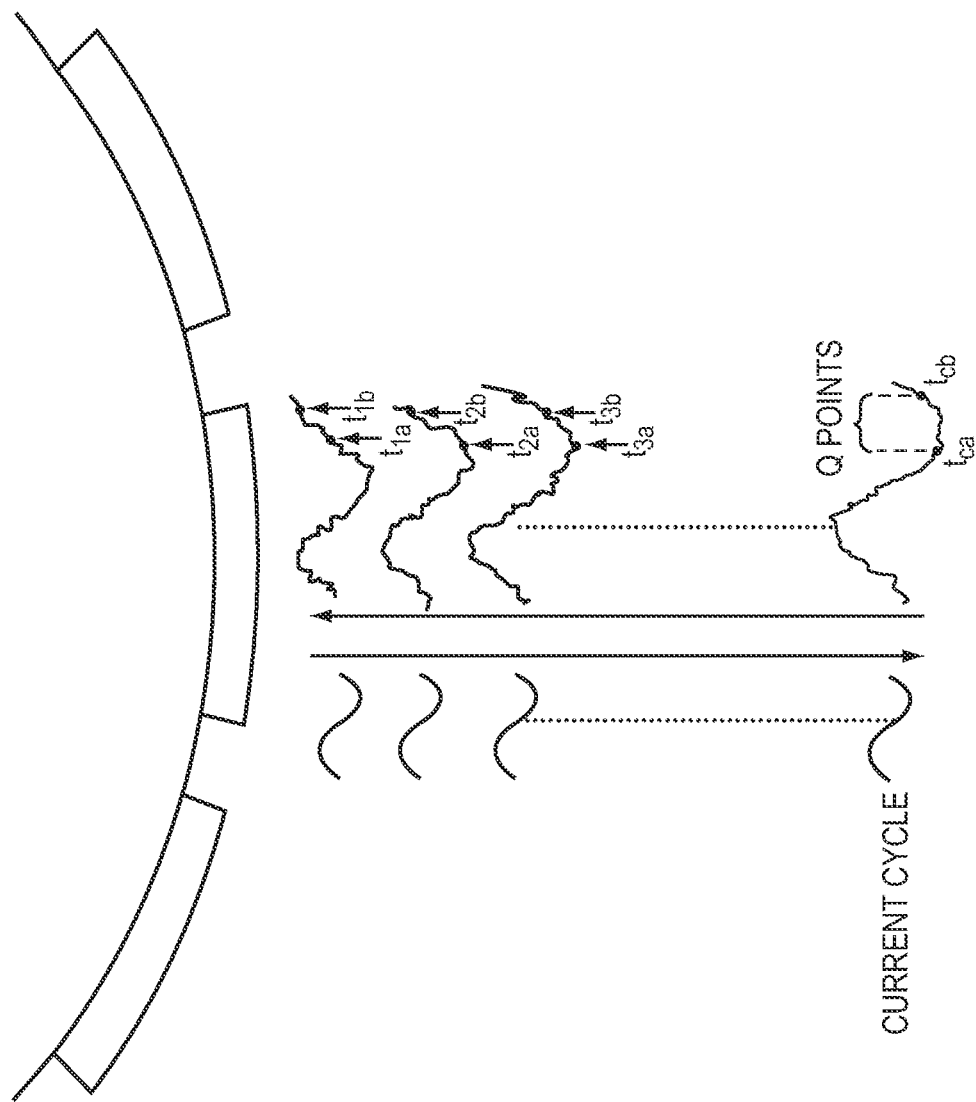
FIG. 6 depicts the method of calculating the short-time averaged amplitude deviations over multiple successive times within a wave cycle.

In other embodiments, short time-averaged amplitude deviations can be used to reduce random variations of the echo amplitudes within a wave cycle. For example, with reference to FIG. 6, the short time-averaged amplitude deviation between time $t_{ca}$ and time $t_{cb}$ in the current cycle is given as:

$$\overline{D}_{st}(t_c) = \frac{1}{Q}(D(t_{ca}) + D(t_{ca+1}) + D(t_{ca+2}) + \dots + D(t_{cb})), \quad (5)$$

where Q is the number of data points received between time $t_{ca}$ to $t_{cb}$ within the current cycle and each pair of consecutive points in the Q data points have equal timing intervals.

Figure 7:
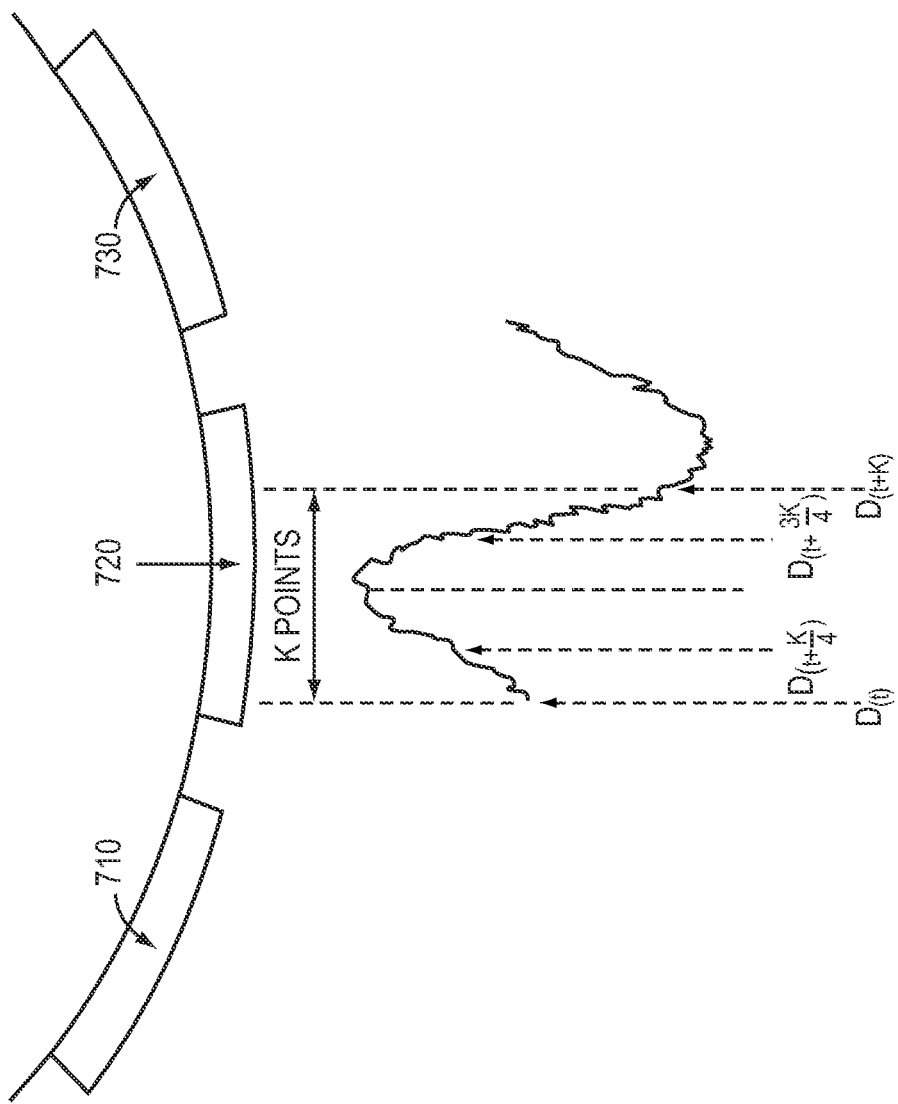
FIG. 7 depicts the method of calculating the peak-detected amplitude deviations within a wave cycle.
Figure 8:
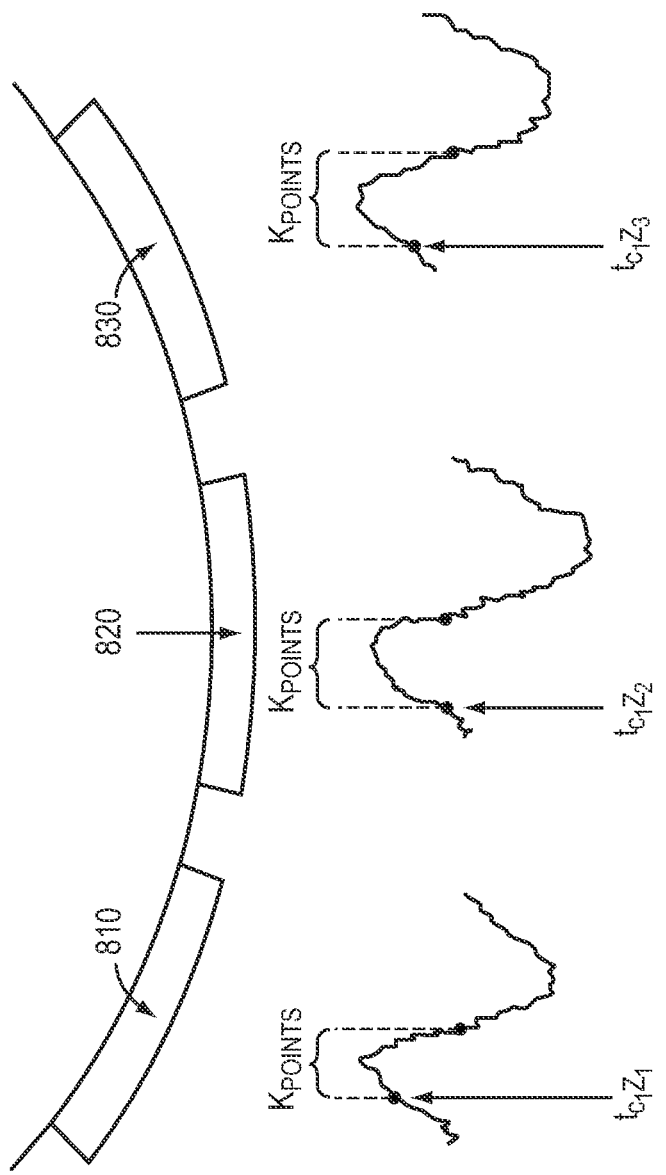
FIG. 8 depicts the method of calculating the spatial average of peak-detected amplitude deviations within a wave cycle.

In various embodiments, the peak-detection algorithm is applied to improve the sensitivity of the detection algorithm to a steep rise in the amplitude deviation that is characteristic of the echo from an object of substantial size, e.g., a human. As depicted in FIG. 7, the peak-detection algorithm calculates a total value $D_D$ from a set of K data points, where K≥4, by subtracting the amplitude deviations D(t) of the first K/4 data points from the last 3K/4 data points, as follows:

$$D_p(t+K)=\text{scale factor}\times\{(-1)\times[D(t)+D(t+1)+D(t+2)+\dots+D(t+(K/4))]+[D(t+(K/4)+1)+D(t+(K/4)+2)+\dots+D(t+K-1)+D(t+K)]\} \quad (6).$$

where $D_p(t+K)$ is the peak-detected amplitude deviation for time t+K, i.e., in the most recent K values of the amplitude deviation D(t) in the current wave cycle, as illustrated in FIG. 7. In one embodiment, as depicted in FIG. 8, movement detections of the objects can be determined based on an average of peak-detected amplitude deviations over adjacent spatial transducers (zones), e.g., 810, 820, and 830 in the current wave cycle; where $$\overline{D}_{p,z}(t+K) = \frac{1}{3}[\overline{D}(t_{c1z1}+K) + \overline{D}(t_{c1z2}+K) + \overline{D}(t_{c1z3}+K)]. \quad (7)$$

In various embodiments, $D_{min}$ and $D_{max}$, the predetermined minimum and maximum deviation thresholds, respectively, can be adjusted at each time t to reflect the various magnitude of the long-term average amplitude in various environments at time t. For example, $D_{min}$ and $D_{max}$ are set as low values when the detection waves are transmitted in a region with low amplitudes of reflected waves; it thus increases the sensitivity of the algorithm in determining the amplitude deviations as well as the duration of echoes. In regions where large random fluctuations of the amplitude deviations are expected even in the absence of moving objects, adjusting $D_{min}$ and $D_{max}$ accordingly increases the immunity of the detection algorithm to such fluctuations. $D_{min}$ and $D_{max}$ can also be adjusted to reflect the ranges of the detected objects. For example, for detecting more distant objects, $D_{min}$ and $D_{max}$ are set as low values in order to increase the sensitivity of the algorithm; as the objects approach the detectors, $D_{min}$ and $D_{max}$ may be adjusted to higher values since the amplitudes of reflected waves decay less significantly over a shorter distance.

The specific values used for $D_{min}$ and $D_{max}$ in a given system strongly depend on the electronic, acoustic, and software design parameters of the system, including, e.g., the sensitivity of the ultrasonic detectors, the gain and offset voltage of the amplifier chain, or the supply voltage used to operate the detector system. Therefore, systems with identical functional performance (e.g., range, detection sensitivity, noise immunity, or response speed) may have different predetermined values of $D_{min}$ and $D_{max}$ due to different components therein.

In an exemplary system with a gain of ~2000 for an amplifier chain, 12 bits of resolution for a microcontroller's analog-to-digital converter (ADC), and 3.3 V of the supply voltage, each ADC count represents about 805 µV at the ADC, or 0.4 µV of electrical signal from the transducer. In this system, values of $D_{max}$ can be in the range of 175 to 300, and values of $D_{min}$ at around 80. With the thresholds capable of dynamically adapting to the amplitude of the average, $D_{max}$ may be set as 300, 250, and 175 for high, moderate, and low average signals, respectively. Alternatively, with the thresholds dynamically adapted based on the ranges of the objects, the values of $D_{max}$ may be chosen as 300, 250, and 175 for close, intermediate, and long ranges, respectively.

Changing the acoustic environment of the transducer, e.g., changes in the ambient noise level at the ultrasonic frequencies to which the transducer elements are sensitive or the directions of the transducer elements, may result in false detection of moving objects. For example, when a noise source (e.g., a tool operated by compressed air) is switched on, the increased background signal level adds to the measured short-term amplitude deviation D(t), and can trigger false positive detections until the long-term average $\overline{A}(t)$ has adapted to the increased background level. Once the noise source to which the motion detector has adapted is switched off, the decreased background signal level may prevent detection of moving objects due to the decrease of all short-term amplitude deviations D(t) until the long-term average amplitude $\overline{A}(t)$ re-adapts. The adaptation of the long-term average amplitude to the new environment may take up to several wave cycles and thereby cause unexpected injuries to moving objects, e.g., humans in the environment. Movements of the transducer elements may also cause the measured short-term deviation D(t) to be erroneous, since the long-term average amplitudes $\overline{A}(t)$ of individual elements no longer reflect amplitudes of the echoes detected within the new field of view for each transducer element.

In various embodiments, detecting changes in the acoustic environment of the transducer elements can be implemented by tracking the integral of the measured amplitude deviations D(t) over time in each wave cycle. The integrated amplitude deviation, $I_{dev}$, can be calculated continuously for each transducer element with established maximum positive and negative thresholds. During a major change to the acoustic environment (e.g., the addition or removal of an ambient noise source, or rotation of the head of the transducer elements), $I_{dev}$ may have a large positive or negative value for some or all transducer elements. The motion-detecting algorithm, therefore, may be retrained to adapt to the new acoustic environment when the value of $I_{dev}$ exceeds either the positive or negative thresholds. Once the long-term amplitude average $\overline{A}(t)$ has adapted to the new acoustic environment, $I_{dev}$ may have a small value even in the presence of multiple moving objects due to their small short-term contributions. This approach minimizes a false detection resulting from changes in the environment.

While the motion detecting algorithm can be automatically and gradually adapted to a changed acoustic environment, adaptation may take a relatively long time. In one embodiment, adaptation is accelerated by suspending the normal motion detecting algorithm for a certain period, e.g., L cycles, and causing the detecting algorithm to rapidly retrain the new average amplitude $\overline{A}_{new}(t)$ as the average of the amplitudes A(t) measured during the retraining period, e.g., L cycles. $\overline{A}_{new}(t)$ is thus given as:

$$\overline{A}_{new}(t) = \frac{1}{L}(A_1(t) + A_2(t) + A_3(t) + \ldots + A_L(t)). \tag{8}$$

At the end of the retraining period (i.e., L cycles), the normal detecting algorithm resumes and the old amplitude average $\overline{A}(t)$ is replaced with the new amplitude average $\overline{A}_{new}(t)$, which is now accurately adapted to the new acoustic environment. In one embodiment, the adaption process can be automatically triggered for each transducer element when $I_{dev}$ of the transducer element exceeds a predetermined threshold. In another embodiment, all transducer elements together are subjected to the retraining process upon detecting $I_{dev}$ of a single transducer element and/or $I_{dev}$ of all transducer elements exceeding a predetermined threshold. This can be done at the transducer startup, and/or by external command, and/or automatically by the transducer in response to detecting major changes in its acoustic environment.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method for adaptively detecting movements of objects within a space, the method comprising:
   emitting pulsed ultrasound waves of a single frequency into the space and detecting reflections of the pulsed ultrasound waves during intervals between successive pulses;
   determining locations of objects within the space based on the detected ultrasound reflections; and
   determining real-time movements of the objects based on (i) amplitude differences between amplitudes of echoes in a current wave pulse and an average amplitude over a plurality of wave pulses and (ii) elapsed times since emission of the ultrasound reflections associated with the amplitude differences,
   wherein a wave pulse comprises emission of a plurality of ultrasound pulses directed at different spatial zones and determining the real-time movements comprises:

for each zone, (i) calculating amplitude deviations of pulses reflected in a single spatial zone within a wave pulse by subtracting the average amplitude within the zone from the amplitudes of the echoes within the zone, and (ii) determining real-time movements within the zone based at least in part on the amplitude deviations; and calculating an average of peak-detected amplitude deviations over a plurality of echoes reflected from adjacent spatial zones in the current wave pulse, wherein the real-time movements are determined based at least in part on the average of peak-detected amplitude deviations.

2. The method of claim 1, wherein a start of an echo occurs when a reflected wave pulse has an amplitude above a predetermined maximum intensity threshold.

3. The method of claim 2, wherein an end of an echo occurs when a reflected wave pulse has an amplitude below a predetermined minimum intensity threshold.

4. The method of claim 3, further comprising determining durations of the echoes based on the maximum and minimum intensity thresholds and the amplitude deviations, wherein the real-time movements are determined based at least in part on the amplitude deviations in the durations of the echoes.

5. The method of claim 3, further comprising:
setting the predetermined maximum and minimum intensity thresholds; and
thereafter adjusting the predetermined maximum and minimum intensity thresholds based on the average amplitude.

6. The method of claim 3, further comprising:
setting the predetermined maximum and minimum intensity thresholds; and
thereafter adjusting the predetermined maximum and minimum intensity thresholds based on the elapsed times of the ultrasound reflections associated with the amplitude differences.

7. The method of claim 1, wherein the amplitudes of the echoes within a zone comprise the amplitudes of echoes from the current wave pulse and from at least one preceding wave pulse.

8. The method of claim 1, wherein the amplitudes of the echoes within a zone comprise the amplitudes of at least two successive values in the current wave pulse.

9. The method of claim 1, further comprising calculating a peak-detected amplitude deviation within the zone in the current wave pulse, wherein the real-time movements are determined based at least in part on the peak-detected amplitude deviations.

10. The method of claim 1, further comprising detecting changes in an acoustic environment of the transducer elements by tracking an integral of the amplitude deviations over time in each wave pulse for each transducer element.

11. The method of claim 10, further comprising replacing the average amplitude of at least one transducer element with an amplitude of (i) the current wave pulse (ii) an amplitude of at least one preceding wave pulse or (iii) an average amplitude of (i) and (ii) when the integral of the amplitude deviations of the at least one transducer element exceeds a predetermined threshold.

12. The method of claim 10, further comprising replacing the average amplitudes of all transducer elements, wherein the average amplitude of each transducer element is replaced with an amplitudes of (i) the current wave pulse (ii) an amplitude of at least one preceding wave pulse or (iii) an average amplitude of (i) and (ii) when the integral of amplitude deviations of at least one of a single transducer element or all transducer elements exceeds a predetermined threshold.

13. The method of claim 1, wherein the average amplitude is based on the amplitudes of echoes received over a sufficient time to encompass changes within the acoustic environment.

14. The method of claim 1, further comprising updating the average amplitude based on the amplitudes of the echoes in the current wave pulse.

15. The method of claim 1, wherein the ultrasound wave pulses are emitted sequentially across zones.

16. The method of claim 1, wherein the ultrasound wave pulses are emitted simultaneously across zones.

17. A system comprising:
an ultrasound transducer comprising a plurality of transducer elements, each element emitting and receiving ultrasound with a spatial zone defined by a solid angle;
drive circuitry coupled to the transducer elements; and
a controller for controlling ultrasound wave pulses of a single frequency emitted from the transducer elements, detecting reflections of the pulsed ultrasound waves during intervals between successive pulses, and determining movements of objects based on (i) amplitude differences between amplitudes of echoes in a current wave pulse and an average amplitude over a plurality of wave pulses and (ii) elapsed times since emission of the ultrasound reflections associated with the amplitude differences wherein a wave pulse comprises emission of a plurality of ultrasound pulses directed at different spatial zones and determining the movements of objects comprises:
for each zone, using the controller to (i) calculate amplitude deviations of pulses reflected in a single spatial zone within a wave pulse by subtracting the average amplitude within the zone from the amplitudes of the echoes within the zone, and (ii) determine movements within the zone based at least in part on the amplitude deviations; and
using the controller to calculate an average of peak-detected amplitude deviations over a plurality of echoes reflected from adjacent spatial zones in the current wave pulse, wherein the movements are determined based at least in part on the average of peak-detected amplitude deviations.

18. The system of claim 17, wherein the transducer elements are arranged in a cluster.

19. The system of claim 17, wherein the transducer elements are arranged in a ring.

20. The system of claim 17, wherein at least some of the emitting and receiving angles of the transducer elements overlap.

21. The system of claim 17, further comprising a finite impulse response filter for calculating the average amplitude.

22. The system of claim 17, further comprising an infinite impulse response filter for calculating the average amplitude.

23. A robot comprising:
at least one actuator;
an actuator controller for operating the at least one actuator; and
a movement detection system comprising:
(i) an ultrasound transducer having a plurality of transducer elements, each element emitting and receiving ultrasound wave pulses of a single frequency with a spatial zone defined by a solid angle;
(ii) drive circuitry coupled to the transducer elements; and
(iii) a detection-system controller for controlling ultrasound wave pulses emitted from the transducer elements, detecting reflections of the pulsed ultrasound waves during intervals between successive pulses, and determining movements of objects based on (i) amplitude differences between amplitudes of echoes in a current wave pulse and an average amplitude over a plurality of wave pulses and (ii) elapsed times since emission of the ultrasound reflections associated with the amplitude differences, wherein a wave pulse comprises emission of a plurality of ultrasound pulses directed at different spatial zones and determining the movements of objects comprises:

for each zone, using the actuator controller to (i) calculate amplitude deviations of pulses reflected in a single spatial zone within a wave pulse by subtracting the average amplitude within the zone from the amplitudes of the echoes within the zone, and (ii) determine movements within the zone based at least in part on the amplitude deviations; and using the actuator controller to calculate an average of peak-detected amplitude deviations over a plurality of echoes reflected from adjacent spatial zones in the current wave pulse, wherein the movements are determined based at least in part on the average of peak-detected amplitude deviations; and further wherein the actuator controller is responsive to the movement-detection system and disables the at least one actuator upon detection of movement proximate to the robot.

\* \* \* \* \*